United States Patent
Nagai

(10) Patent No.: US 6,930,726 B2
(45) Date of Patent: Aug. 16, 2005

(54) DIGITAL CAMERA WITH MODE SELECTING DEVICE CAPABLE OF DISPLAYING CAMERA CONDITION

(75) Inventor: Norio Nagai, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 625 days.

(21) Appl. No.: 09/894,009

(22) Filed: Jun. 29, 2001

(65) Prior Publication Data

US 2002/0012066 A1 Jan. 31, 2002

(30) Foreign Application Priority Data

Jul. 31, 2000 (JP) .................................... 2000-231674

(51) Int. Cl.⁷ .............................................. H04N 5/225
(52) U.S. Cl. .................................................... 348/373
(58) Field of Search ........................... 348/373, 207.99, 348/333.02, 333.04, 333.06, 375, 376; 396/381

(56) References Cited

U.S. PATENT DOCUMENTS 6,341,202 B1 * 1/2002 Hosokawa et al. .......... 396/281
6,351,609 B1 * 2/2002 Hosokawa et al. .......... 396/177

* cited by examiner

*Primary Examiner*—Wendy R. Garber
*Assistant Examiner*—Gary C. Vieaux
(74) *Attorney, Agent, or Firm*—Sughrue Mion, PLLC

(57) ABSTRACT

A mode selecting dial and an indicator are provided on a digital camera body. Plural symbols corresponding to each mode are printed on the mode selecting dial. When one of the plural symbols is set at the indicator, the digital camera is set to the mode corresponding to the symbol. The indicator has an oblong cover, and a green LED and a red LED, which were formed inside of the oblong cover. The green LED and the red LED emit light simultaneously or by choice according to the condition of the digital camera. The condition of the digital camera can be known by light emission of the indicator.

12 Claims, 3 Drawing Sheets

DIGITAL CAMERA WITH MODE SELECTING DEVICE CAPABLE OF DISPLAYING CAMERA CONDITION

BACKGROUND OF THE INVENTION

1. Field of the Invention

The present invention relates to a digital camera, more particularly relates to a digital camera with a mode selecting device having a function of displaying camera condition.

2. Description of the Prior Arts

Recently, a digital camera has become popular rapidly. The digital camera has a CCD image sensor which transforms optical image into electric signal and a A/D converter which transforms the electric signal into image data of a digital signal. The image data is written in a built-in memory, a loadable memory card and so on. The digital camera has various modes comparing with photo cameras using silver halide photographic film. There are a taking mode and a setting mode for setting various devices, for example. The taking mode has an auto-taking mode, a manual-taking mode, a sequence-taking mode and a movie-taking mode. Likewise, the setting mode has a driving condition setting mode for a liquid crystal panel used as an electric viewfinder and a monitor, a power-setting mode for auto power-off, a sound-setting mode for beeping sound, and a date and time adjusting mode.

In order to select one of these modes, for example, a rotational mode selecting dial is used. Characters and marks (the following is referred to symbol) showing each mode are printed on the surface of the mode selecting dial. The camera body is provided with an indicia, such as lines, grooves and convexes, for the mode selecting dial to target. When the symbol of the mode selecting dial is set at the indicia, the mode corresponding to the symbol is chosen.

On the other hand, there are some digital cameras having an indicator that announces to a user the condition of camera by light. A LED is used for this indicator and disposed near the finder, for example. When the indicator continuously lights up green (hereinafter it is just referred to light up), showing the photographic preparation is ready. When it twinkles with green, showing the auto focus is in operation, warning of camera-shake, or writing in a memory card. In the same way, when it twinkles with red, showing the memory card is not inserted, the camera is in wrong operation, or out of order. On twinkling with orange, showing the flash is charging. In addition, this orange is a mixed color of green and red. However, as the mode selecting device and the indicator are set separately in the conventional digital camera, a number of parts are needed, increasing a cost. Besides, the mode selecting device and the indicator are not observed at a time. Recently, it is desired that not only the digital camera has many functions but also the device for performing the functions is a good design.

SUMMARY OF THE INVENTION

In view of the foregoing, a primary object of the present invention is to provide a digital camera of simple structure and low cost, having a mode selecting function and a display function for indicating camera condition.

Another object of the present invention is to provide a digital camera whose selected mode and camera condition can be observed at a time.

Further, another object of the present invention is to provide a digital camera which is superior in design.

The above objects and other objects are achieved by providing a movable mode selecting operation member and a luminous indicator. Plural symbols are providing on the mode selecting operation member, corresponding one symbol to one mode. Upon selecting a mode, the mode selecting operation member is moved so as to set a desired symbol at the indicator, and then the mode corresponding to the symbol is effective. The indicator is lighted up, showing camera condition. The camera condition has nothing to do with the selected mode in the mode selecting operation member.

There are continuous lighting and twinkling of the indicator, by which two kinds of camera condition can be displayed. And plural camera conditions can be displayed by means of emitting plural color lights, each color light corresponding to one camera condition. Further, it is possible to display a large number of camera conditions by combining color lights with the state of lighting (continuous lighting and flashing).

According to the present invention, as the indicator is luminous, camera condition can be displayed with ease. Besides, since the luminousable indicator is used as a target of the mode selecting operation member, a special display apparatus for showing camera condition is unnecessary. Further, as the indicator emits a light, giving users a novel and unconventional design image.

BRIEF DESCRIPTION OF THE DRAWINGS

The above objects and advantages of the present invention will become apparent from the following detailed description of the preferred embodiments when read in association with the accompanying drawings.

DETAILED DESCRIPTION OF THE PREFERRED EMBODIMENTS

Figure 1:
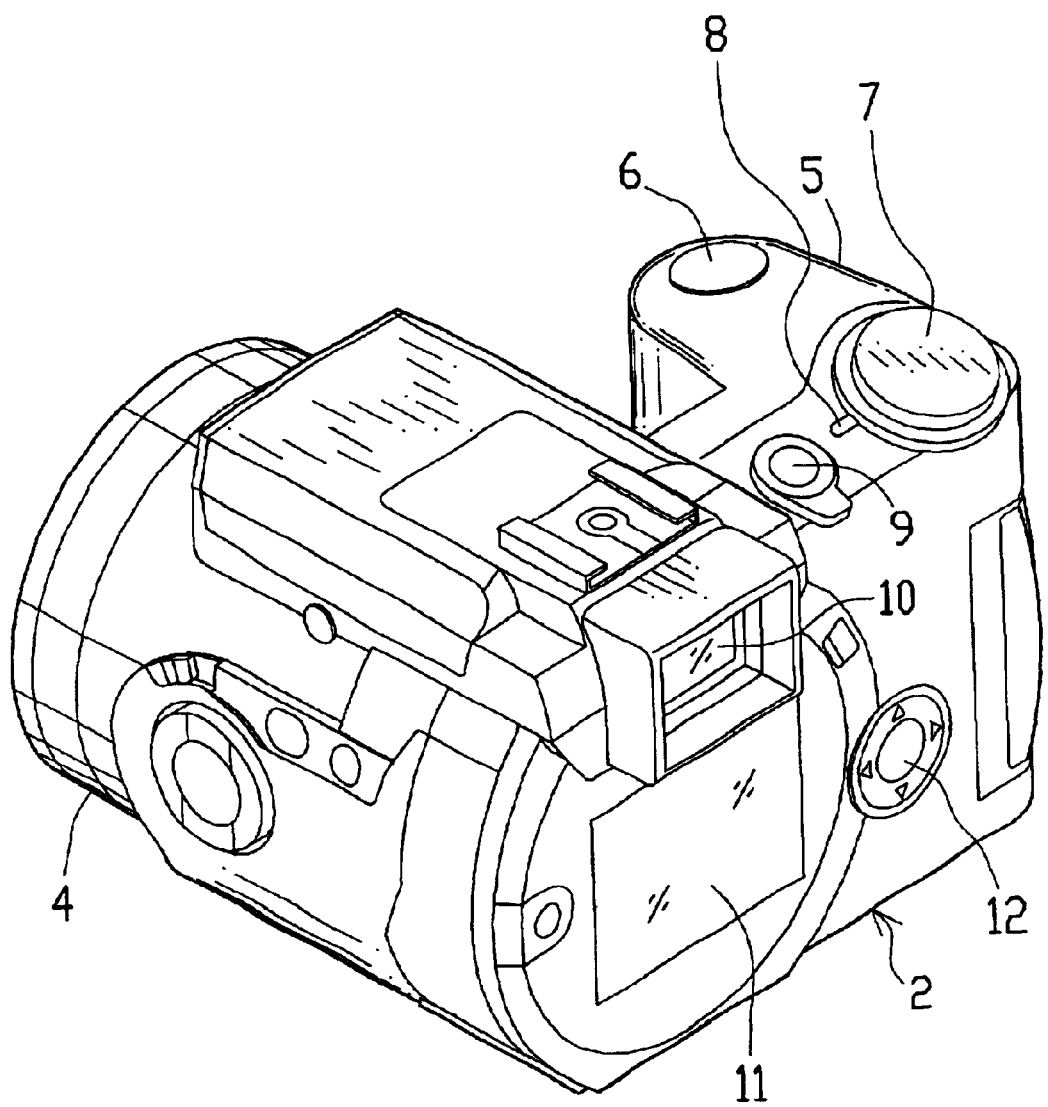
FIG. 1 is a perspective view illustrating a digital camera of the present invention.

In FIG. 1, there is a lens barrel 4 on the left side of a camera body 2. The lens barrel 4 holds a taking lens 3 (refer to FIG. 4). The right side of the camera body 2 is provided with a grip portion 5 for holding with right hand, on top of which a shutter button 6 is provided.

The top rear side of the grip portion 5 is inclined so that a user can easily look at. A mode selecting dial 7, an indicator 8 and a power switch 9 are provided on the inclining surface. There are provided an electronic viewfinder 10, a large liquid crystal panel 11 and a multi operation button 12 at the rear surface of the camera body 2. The large liquid crystal panel 11 is used for replaying the taken picture and showing the operation message. The multi operation button 12 is used for zooming of the taking lens 3 and the forth.

Figure 2:
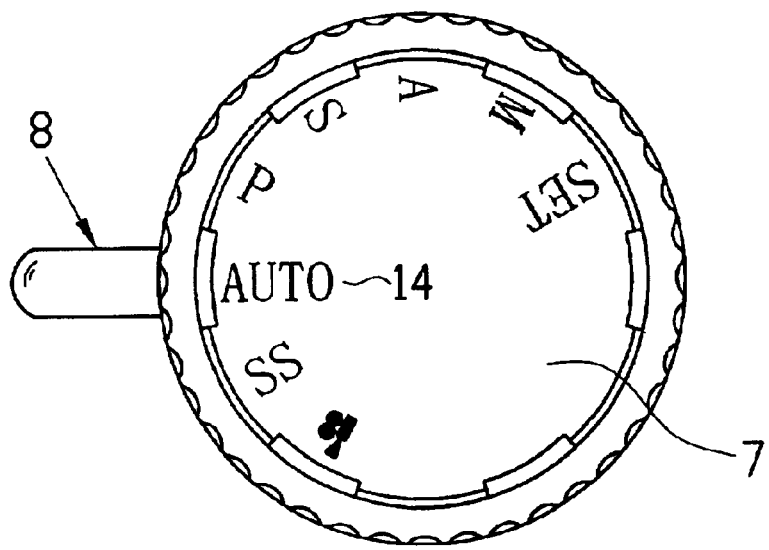
FIG. 2 is a top view illustrating an indicator and a mode selecting dial.

As shown in FIG. 2, symbols showing various modes are printed on the surface of the mode selecting dial 7. For example, character 14 of "AUTO" means auto taking mode. On choosing a desired mode, the mode selecting dial 7 is rotated so as to set the symbol corresponding to the desired mode at the indicator 8.

Figure 3:
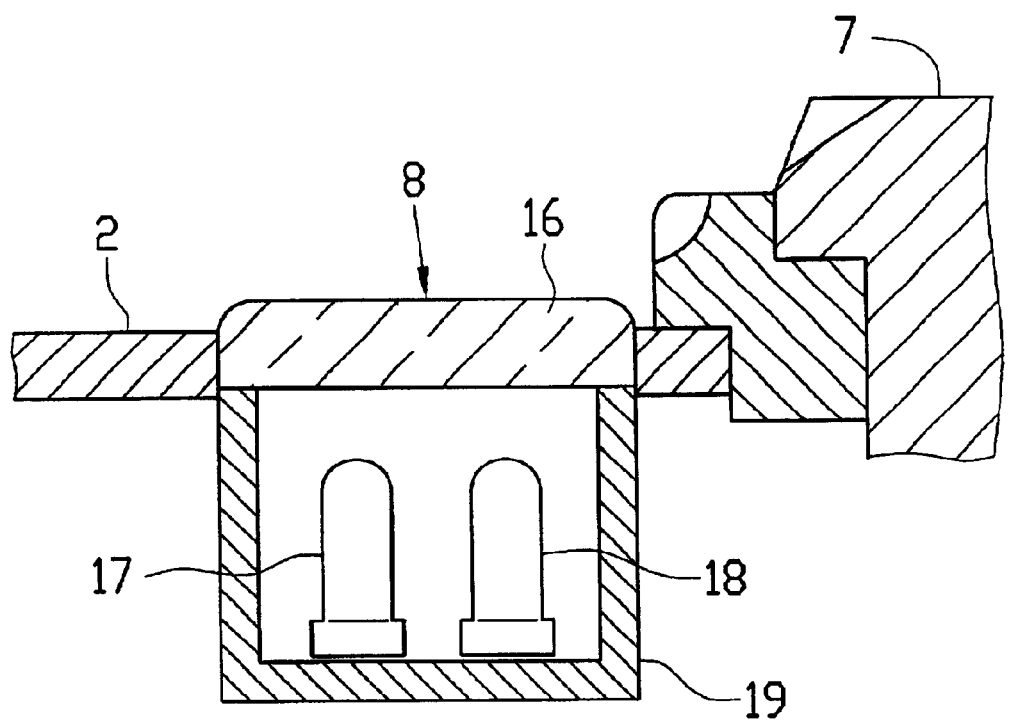
FIG. 3 is a sectional view illustrating structure of an indicator.

As shown in FIG. 3, the indicator 8 is constituted of a lens cover 16, a green LED 17, a red LED 18, and a case 19. The long cover 16 is made of transparent and colorless resin whose top surface is semicylindrical. The green LED 17 emits green light and the red LED 18 emits red light, both of which are disposed under the long cover 16. The case 19 contains these LEDs 17 and 18 and is closed by the long cover 16. The case 19 prevents from emitting the light from the LEDs 17 and 18 excepting for the cover 16. And the surface of the cover 16 is given a satin finish, taking the property of the light diffusion into consideration.

The indicator 8 displays various kinds of the condition of the digital camera when the green LED 17 and the red LED 18 light up by choice or simultaneously, and by continuous lighting or flashing. In the present embodiment, for example, when the green LED 17 lights up, meaning the taking preparation is ready, whereas when the green LED 17 is flashing, meaning the auto focus and the like are in operation or warning camera-shake, or writing data in a memory card. In the same way, when the red LED 18 is flashing, meaning the memory card is not inserted, the digital camera is in wrong operation or out of order. Besides, when both of the green LED 17 and the red LED 18 are concurrently flashing to produce orange flash light, meaning the flash device is being charged. In addition, a smart media (trademark) and so forth are used as the memory card.

Figure 4:
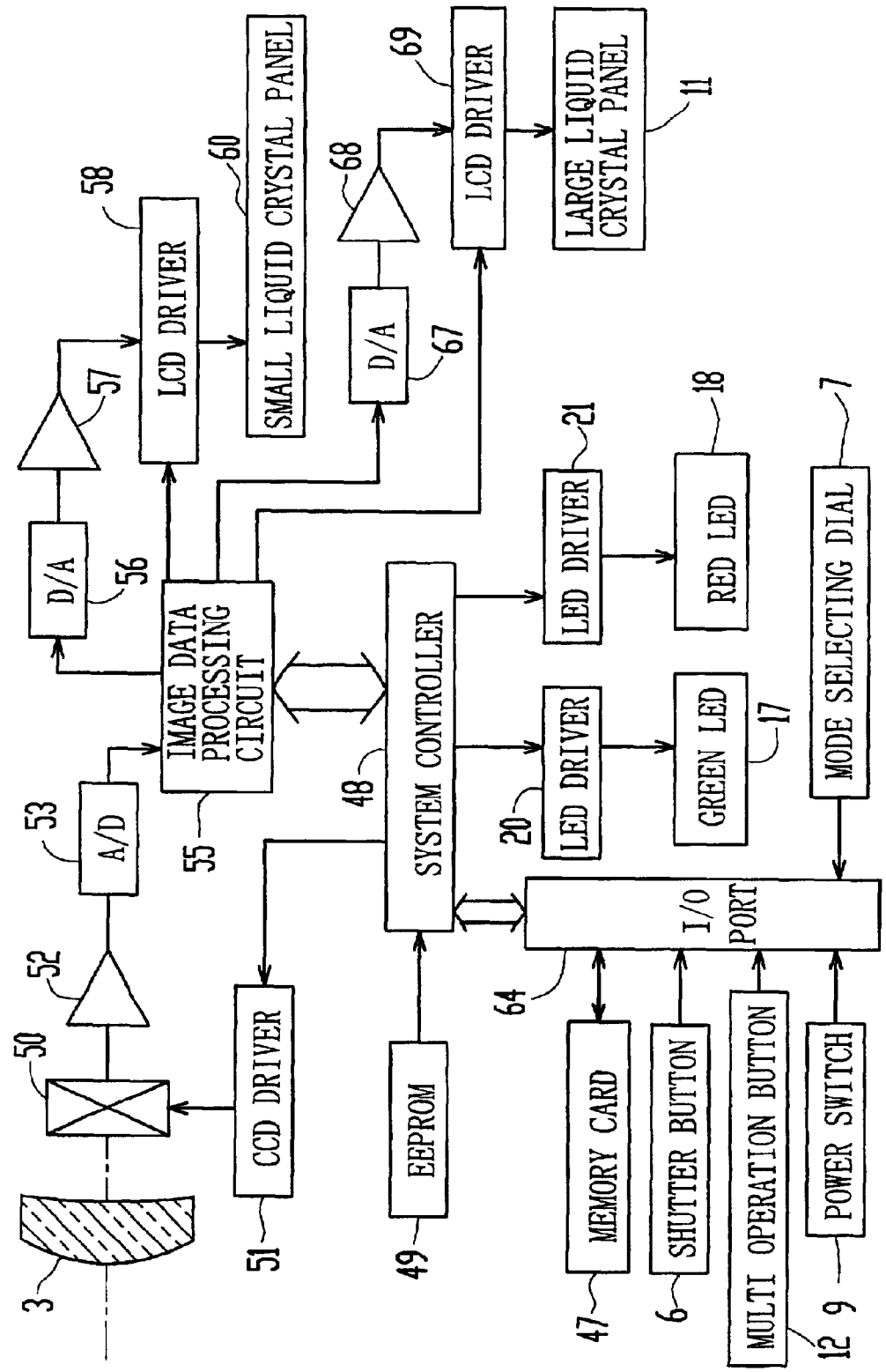
FIG. 4 is a block diagram illustrating electric structure of a digital camera.

In FIG. 4 illustrating an electric construction of the digital camera, the green LED 17 and the red LED 18 are respectively controlled by a system controller 48 through LED drivers 20 and 21. A CCD image sensor 50 is disposed at the rear of the taking lens 3 and by focusing the taking lens 3 on an object, an image of the object is formed on a light receiving surface of the CCD image sensor 50. The CCD image sensor 50, driven by a CCD driver 51, transforms optical object image into electric image signal to output.

Micro color filters of R, G and B are arranged in a mosaic pattern on the light receiving surface of the CCD image sensor 50. After electric signal of each pixel which is serially output from the CCD image sensor 50 is amplified at a suitable level in an amplifier 52, it is digitally converted by an A/D converter 53. As known well, the sampling time between a drive of the CCD driver 51 and the A/D converter 53 is synchronous.

To make image data, the A/D converter 53 digitally transforms electric signal of each pixel, inputting into an image data processing circuit 55 as they come in. The image data processing circuit 55 does a signal processing against the image data such as matrix calculation, white balance adjusting, gamma correction and the like. Further, based on the processed image data, the image data processing circuit 55 forms image signal in accordance with composite signal of NTSC formula and inputs into a liquid crystal display driver (LCD driver) 58 through a D/A converter 56 and an amplifier 57. Since the LCD driver 58 drives a small liquid crystal panel 60 formed of the electronic viewfinder 10, the object image is continuously displayed in a small liquid crystal panel 60.

The system controller 48 exchanges data with an EEPROM 49. A variety of sequence program, correction data and control data are stored in the EEPROM 49.

The system controller 48 observes signals from the shutter button 6, the mode selecting dial 7, the power switch 9, the multi operation button 12 and the forth through an I/O port 64, doing signal processing according to the inputted signals, as well as writing in and reading from the memory card 47. The memory card 47 is inserted and rejected from the slot formed at the side portion of the grip portion 5. The memory card 47 memorizes the image data outputted from the image data processing circuit 55 by one frame.

When the play mode is opted by the operation of the mode selecting dial 7, the system controller 48 reads out the image data from the memory card 47 and sends it to the image data processing circuit 55. The image data processing circuit 55, based on the input image data, produces image signal corresponding to the composite signal of NTSC formula and outputs it to a LCD driver 69 through a D/A converter 67 and an amplifier 68. The LCD driver 69 actuates the large liquid crystal panel 11, displaying the image based on the image data on the large liquid crystal panel 11. The large liquid crystal panel 11 can also display the shooting image simultaneously in the same way as the small liquid crystal panel 60.

Next, the operation of the above embodiment is explained. Upon choosing the mode, the mode selecting dial 7 is rotated to set a symbol corresponding to the requested mode at the indicator 8. For normal taking, the character 14 of "AUTO" is set at the indicator 8. On framing an object to be taken, an image of the object is simultaneously displayed in the electronic viewfinder 10. When a user pressed the shutter button 6 at a proper timing while observing, digital data of the object image is recorded in the memory card 47.

So as to indicate the condition of the digital camera, the system controller 48 makes the indicator 8 emit a light by lighting up or flashing the green LED 17 and the red LED 18. For example, as there is a time after the shutter button 6 is pushed until the image data is entirely recorded into the memory card 47, the green LED 17 is flashing. This lets a user know that the image data is writing into the memory card 47. However in case that the indicator 8 is flashing in green, meaning relatively small amount of data being written, therefore a user can take a next taking immediately.

When "SET" on the mode selecting dial 7 is set at the indicator 8, high quality taking mode is set. As a great volume of data is written in the memory card 47 in the high quality, it takes a long time for writing. In this case both of the green LED 17 and the red LED 18 light up and the indicator 8 emits a light in orange. A user waits until the orange light goes off for the next taking. Similarly the indicator 8 lights up according to numerous situations, indicating the camera condition.

In this way, as the indicator 8 is used as a target of the mode selecting dial 7, a user can know the condition of the digital camera as well as the set mode. Also, since the target is luminous, different from the printed line and the unevenness, it has a stronger visual appeal in view of the design.

As a light source of the present invention, in addition to the green LED and red LED, it is also suitable to add a blue LED which emits blue light, using them as three LEDs. In this case, a user can acquire a further large number of information than the above embodiment. Moreover it is possible to increase indicative information furthermore because they can emit various kinds of colored lights by controlling its balance. And as the design of the digital camera looks bright, it is easy to differentiate it from other products.

In the above embodiment, it is also suitable that the cover 16 is made of semitransparent resin besides transparent and colorless resin. The cover 16 takes the form of edge-round and oblong as a whole, but an arrow or a triangle ones is suitable, too. Likewise, although the mode selecting dial is used as a mode switch operation member in the above embodiment, a slide system selecting lever, for instance, is also suitable.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, there should be construed as included therein.

What is claimed is:

1. A digital camera having plural modes comprising:

a mode selecting operation member for choosing one mode among said plural modes;

plural symbols formed in said mode selecting operation member, each symbol corresponding to said modes;

an indicator to be set one of said plural symbols by operating said mode selecting operation member, a mode corresponding to said symbol being chosen and indicated by said indicator; and a light source for lighting said indicator, indicating at least two conditions of said digital camera by lighting state of said indicator, said conditions of the digital camera being unrelated with said opted mode.

2. A digital camera as claimed in claim 1, wherein said lighting state includes a continuous lighting and flashing which indicate two kinds of condition of said digital camera.

3. A digital camera as claimed in claim 1, wherein said light source emits a colored light among plural colored lights, said plural color lights indicating plural condition of said digital camera.

4. A digital camera as claimed in claim 1, wherein said light source includes plural LEDs that emits different colors.

5. A digital camera as claimed in claim 1, wherein said indicator includes a transparent cover that is disposed on the outside of a camera body.

6. A digital camera as claimed in claim 5, wherein an outer surface of said cover is satin finished.

7. A digital camera as claimed in claim 6, wherein said light source is disposed under said cover.

8. A digital camera as claimed in claim 7, wherein said mode selecting operation member is a dial rotatably attached to a surface of said digital camera body, said indicator being disposed adjacent to said dial.

9. A digital camera having plural modes comprising:

a mode selecting operation member for choosing one mode among said plural modes;

plural symbols formed in said mode selecting operation member, each symbol corresponding to said modes;

an indicator to be set to one of said plural symbols by operating said mode selecting operation member, a mode corresponding to said symbol being chosen; and a light source for lighting said indicator, indicating at least a condition of said digital camera by lighting state of said indicator, said condition of the digital camera being unrelated with said opted mode, wherein the condition of said digital camera is at least one of auto-focus is in operation, camera-shake warning, writing to a memory card, the memory card is not inserted, the digital camera is malfunctioning and a flash device is being charged.

10. The digital camera of claim 9, wherein the indicator flashes a first color for the conditions where the auto-focus is in operation, where the camera-shake warning is initiated and where the writing to the memory card is initiated.

11. The digital camera of claim 9, wherein the indicator flashes a second color for the conditions where the memory card is not inserted and where the digital camera is malfunctioning.

12. The digital camera of claim 9, wherein the indicator flashes first and second colors creating a third color for the condition where the flash device is being charged.

* * * * *